United States Patent
Kang et al.

(10) Patent No.: US 10,815,579 B2
(45) Date of Patent: Oct. 27, 2020

(54) CATALYST FOR WATER SPLITTING AND METHOD FOR PREPARING SAME

(71) Applicant: Seoul National University R&DB Foundation, Seoul (KR)

(72) Inventors: Ki-Suk Kang, Gwacheon-si (KR); Ju-Seong Kim, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 77 days.

(21) Appl. No.: 15/578,533

(22) PCT Filed: Jun. 22, 2016

(86) PCT No.: PCT/KR2016/006625
§ 371 (c)(1),
(2) Date: Nov. 30, 2017

(87) PCT Pub. No.: WO2016/208965
PCT Pub. Date: Dec. 29, 2016

(65) Prior Publication Data
US 2018/0135191 A1 May 17, 2018

(30) Foreign Application Priority Data
Jun. 25, 2015 (KR) .......................... 10-2015-0090498

(51) Int. Cl.
| C25B 11/04 | (2006.01) |
| C25B 11/12 | (2006.01) |
| B01J 37/03 | (2006.01) |
| B01J 23/70 | (2006.01) |
| B01J 23/34 | (2006.01) |
| B01J 21/06 | (2006.01) |

(52) U.S. Cl.
CPC .......... C25B 11/0478 (2013.01); B01J 21/06 (2013.01); B01J 23/34 (2013.01); B01J 23/70 (2013.01); B01J 37/03 (2013.01); C25B 11/12 (2013.01)

(58) Field of Classification Search
CPC .................................................. C25B 11/0478
See application file for complete search history.

(56) References Cited

U.S. PATENT DOCUMENTS

2007/0212594 A1* 9/2007 Takasu ..................... C25B 1/34
204/252

FOREIGN PATENT DOCUMENTS

| KR | 10-2011-0033212 A | 3/2011 |
| KR | 10-2013-0048728 A | 5/2013 |
| KR | 10-2013-0084472 A | 7/2013 |

OTHER PUBLICATIONS

Efficient Water Oxidation Using Nanostructured alpha-Nickel-Hydroxide as an electrocatalyst Minrui Gao et al. J. Am. Chem. Soc., v136, pp. 7077-7084 (Year: 2014).*

(Continued)

*Primary Examiner* — Douglas B Call
(74) *Attorney, Agent, or Firm* — Lewis Roca Rothgerber Christie LLP

(57) ABSTRACT

The present invention relates to a catalyst for water splitting consisted of an oxide or a hydroxide that comprises silicon and one or more transition metals selected from a group consisting of Mn, Fe, Co, Ni, and Cu, and is amorphous, and a method of preparing the same.

2 Claims, 6 Drawing Sheets

(56) References Cited

OTHER PUBLICATIONS

When Layered Nickel-Cobalt Silicate Hydroxide Nanosheets Meet Carbon Nanotubes: A synergetic coaxial Nanocable Structure for Enhanced Electrocatalytic Water Oxidation. Ce Qiu et al. ACS Appl. Mater. Interfaces, v8, pp. 945-951 (Year: 2015).*

Jin, Renxi et al., "Facile Synthesis of Well-Dispersed Silver Nanoparticles on Hierarchical Flower-like $Ni_3Si_2O_5(OH)_4$ with a High Catalytic Activity towards 4-Nitrophenol Reduction", Chemistry—An Asian Journal, 2012, vol. 7, No. 12, pp. 2955-2961.

Kim, Ju Seong et al., "Amorphous Cobalt Silicate Electrocatalyst for Water Oxidation", Abstract of 2015 Spring Meeting of the Korean Ceramic Society, Apr. 2015, p. 139, P1-G2-4.

White, Rachel D. et al., "Morphological Control of Synthetic $Ni_3Si_2O_5(OH)_4$ Nanotubes in an Alkaline Hydrothermal Environment", Journal of Materials Chemistry A, 2013, vol. 1, No. 3, pp. 548-556.

* cited by examiner

CATALYST FOR WATER SPLITTING AND METHOD FOR PREPARING SAME

CROSS-REFERENCE TO RELATED APPLICATION(S)

This application is a National Phase Patent Application of International Patent Application Number PCT/KR2016/006625, filed on Jun. 22, 2016, which claims priority of Korean Patent Application 10-2015-0090498, filed Jun. 25, 2015. The entire contents of both of which are incorporated herein by reference.

BACKGROUND OF THE INVENTION

1. Field of the Invention

The present disclosure relates to a catalyst for water splitting that does not corrode in acid, with low voltage consumption during electrolysis of water, and a preparation method of the same.

2. Description of the Related Art

Recently, due to the depletion of carbon-based energy and the emission of fuel gas, the development of new energy is becoming urgent. With the rising problem of global warming, the development of environmentally friendly energy that does not generate greenhouse gas is becoming urgent. As a solution to such problems, research is actively being carried out to produce hydrogen by splitting water.

Biological, photochemical, electrolytic, direct pyrolysis and thermochemical methods are representative methods of producing hydrogen by splitting water. In the case of electrolysis, it is in a stage of being put into practical use to some extent, but techniques other than the electrolysis method are still in the stage to be studied. Especially in the case of electrolysis, a high voltage of 1.23 V or more is required. In addition, since the reaction for decomposing water is an endothermic reaction, considerable energy must be applied, using electrolysis, photo-catalysis, electrochemical methods and the like.

Also, in a photochemical method of producing hydrogen, additional overvoltage, as much as a band gap of about 2.4 eV, is required to overcome the flow of electron holes, diffusion of substances, interface reaction resistance, and the like, in addition to the energy of 1.23 V required for water splitting.

Therefore, in order to overcome such a problem, there is a need for a catalyst for splitting water that minimizes power consumption by lowering the generation of oxygen while activating the generation of hydrogen, thereby reducing the overall power consumption, which does not corrode in acid.

As prior arts related thereto, there is a water decomposition oxygen generating catalyst, a method of producing the same, an electrode, and a water decomposition oxygen generating apparatus disclosed in Korean Patent Laid-Open Publication No. 10-2013-0084472 (published on Jul. 25, 2013).

SUMMARY OF THE INVENTION

The present disclosure is directed to providing a catalyst for water splitting and a preparation method of the same, wherein the voltage consumption for splitting water is low and the catalyst does not corrode in an acidic electrolyte.

The problems to be solved by the present disclosure are not limited to the above-mentioned problem(s), and other problem(s) not mentioned can be clearly understood by those skilled in the art from the following description.

According to an exemplary embodiment of the present disclosure, a catalyst for water splitting may be consisted of an oxide or a hydroxide that includes silicon and one or more transition metals selected from a group consisting of Mn, Fe, Co, Ni, and Cu, and may be amorphous.

In another aspect of the present disclosure, the catalyst for water splitting may be expressed by the following chemical formula 1:

$$M_3Si_xO_y(OH)_z,\quad \text{[Chemical formula 1]}$$

wherein M is one or more element(s) selected from a group consisting of Mn, Fe, Co, Ni, and Cu, and x, y, z are $2 \le x \le 4$, $5 \le y \le 10$, $2 \le z \le 4$, respectively.

At this time, the catalyst for water splitting may be amorphous.

In addition, an exemplary embodiment of the present disclosure provides a method of preparing a catalyst for water splitting that may include, preparing a solution that includes a transition metal ion by putting a transition metal into a solvent; preparing a solution that includes a silicate ion by putting a silicon compound into a solvent; and combining and then precipitating the transition metal ion and the silicate ion by adding the solution that includes the silicate ion to the solution that includes the transition metal ion.

The transition metal may be one or more selected from a group consisting of Mn, Fe, Co, Ni, and Cu.

The silicon compound may be one selected from a group consisting of $Na_2SiO_3$ and $Na_2SiO_3 \cdot nH_2O$ (n=5, 6, 8, 9).

The atomic ratio of the transition metal ion and the silicon ion may be 1:0.6~1.4.

In addition, an exemplary embodiment of the present disclosure provides a method of preparing a catalyst for water splitting that may include, attaching a transition metal ion to a working electrode, by putting the transition metal ion into a solvent to prepare a solution that includes the transition metal ion and then immersing the working electrode used in electrolysis of water; preparing a solution that includes a silicate ion by putting a silicon compound into a solvent; combining the transition metal ion of the working electrode and the silicate ion by immersing the working electrode having the transition metal ion attached thereto in distilled water and then putting the working electrode into the solution that includes the silicate ion; and immersing the working electrode combined with the transition metal ion and silicate ion in distilled water.

The working electrode may be one selected from a group consisting of carbon paper, glassy carbon, FTO (fluorinated tin oxide) and ITO (indium tin oxide).

The catalyst for water splitting according to the present disclosure is capable of preventing the problem of a catalyst corroding due to acid in an electrolyte having a low pH, and is capable of significantly lowering the voltage applied during electrolysis of water by accelerating the reaction at an interface between the electrode and the electrolyte.

Further, unlike the conventional method of preparing a catalyst through electrical deposition, according to the method of preparing a catalyst for splitting water of the present disclosure, a catalyst can be prepared just through the configuration of precipitating by adding a solution that includes a silicate ion to a solution that includes a transition metal. Therefore, there is no need for applying voltage and special equipment or heat treatment, so it is possible to significantly decrease manufacturing costs.

DETAILED DESCRIPTION OF THE INVENTION

Example 1

Figure 1:
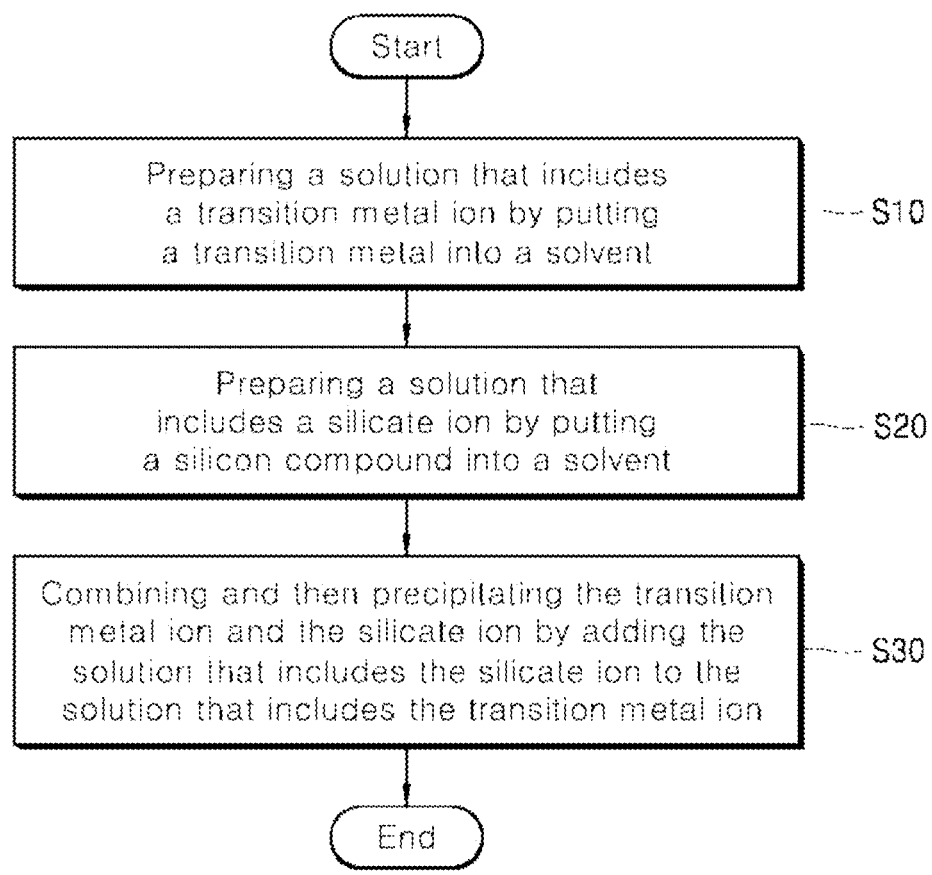
FIG. 1 is a flowchart showing a preparation method of a catalyst for splitting water according to the present disclosure.

Preparation of a Catalyst for Water Splitting 1

CoCl$_2$ was put into distilled water to prepare a solution in which Co$^{2+}$ ions were formed, and then Na$_2$SiO$_3$ was put into distilled water to prepare a solution in which SiO$_3^{2-}$ ions were formed. The solution with the SiO$_3^{2-}$ ions formed was put into the solution with the Co$^{2+}$ ions formed to combine the Co$^{2+}$ ions and SiO$_3^{2-}$ ions to prepare a catalyst for water splitting. At this time, the atomic ratio of Co$^{2+}$ ions and SiO$_3^{2-}$ was set to be 3:4.

Example 2

Preparation of a Catalyst for Water Splitting 2

A carbon paper used as a working electrode during water splitting was put in the solution having Co$^{2+}$ ions formed that was prepared in Example 1, to attach the Co$^{2+}$ ions to the carbon paper. In order to leave only the Co$^{2+}$ ions attached to the surface of the working electrode, the carbon paper was immersed in distilled water. Next, the carbon paper was put in the solution having SiO$_3^{2-}$ ions formed that was prepared in Example 1, to have the Co$^{2+}$ ions attached to the carbon paper combined with the SiO$_3^{2-}$ ions. In order to remove the remaining SiO$_3^{2-}$ ions, the carbon paper was immersed in distilled water. The Co$^{2+}$ ions and SiO$_3^{2-}$ ions were combined to form a catalyst film on the surface of the working electrode.

Hereinafter, the present invention will be described more fully with reference to the accompanying drawings, in which exemplary embodiments of the invention are shown.

The present disclosure and methods of accomplishing the same may be understood more readily by reference to the following detailed description of embodiments and the accompanying drawings. However, the present disclosure may be embodied in many different forms, and should not be construed as being limited to the embodiments set forth herein. Rather, these embodiments are provided so that this disclosure will be thorough and complete and will fully convey the concept of the invention to those skilled in the art, and the present disclosure will only be defined by the appended claims.

In addition, when it is determined that there is a known technology and the like in regards to describing the present disclosure which may blur the point of the present disclosure, detailed description thereof will be omitted.

The present disclosure provides a catalyst for water splitting that is consisted of an oxide or a hydroxide that includes silicon and one or more transition metals selected from a group consisting of Mn, Fe, Co, Ni, and Cu, and is amorphous.

The catalyst for water splitting according to the present disclosure is capable of preventing the problem of a catalyst corroding due to acid in an electrolyte having a low pH, and is capable of significantly lowering the voltage applied during electrolysis of water by accelerating the reaction at an interface between the electrode and the electrolyte.

In more detail, the present disclosure provides a catalyst for water splitting expressed by the following chemical formula 1:

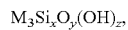
[Chemical formula 1]

(wherein M is one or more element(s) selected from a group consisting of Mn, Fe, Co, Ni, and Cu, and x, y, z are 2≤x≤4, 5≤y≤10, 2≤z≤4, respectively).

The catalyst for water splitting is amorphous. The catalyst for splitting water according to the present invention is formed to be amorphous, so the overpotential is formed to be less than that of crystalline and the active site is increased, which is useful for splitting water.

In addition, the present disclosure provides a method of preparing a catalyst for water splitting that includes, preparing a solution that includes a transition metal ion by putting a transition metal into a solvent;

preparing a solution that includes a silicate ion by putting a silicon compound into a solvent; and combining and then precipitating the transition metal ion and the silicate ion by adding the solution that includes the silicate ion to the solution that includes the transition metal ion.

Unlike the conventional method of preparing a catalyst through electrical deposition, by using the method of preparing a catalyst for splitting water of the present disclosure, a catalyst can be prepared just through the configuration of precipitating by adding a solution that includes a silicate ion to a solution that includes a transition metal. Therefore, there is no need for applying voltage and special equipment or heat treatment, so it is possible to significantly decrease manufacturing costs.

FIG. 1 is a flowchart showing a preparation method of a catalyst for splitting water according to the present disclosure. Referring to FIG. 1, the present invention will be described in more detail.

The method of preparing a catalyst for water splitting according to the present disclosure includes preparing a solution that includes a transition metal ion by putting the transition metal ion into a solvent in step S10.

When the transition metal is put in water, the transition metal exists in an ion state in the water.

At this time, the transition metal used can be one or more selected from a group consisting of Mn, Fe, Co, Ni, and Cu.

In addition, the solvent used can be one or more selected from a group consisting of water, distilled water, and deionized water.

Next, the method of preparing a catalyst for water splitting according to the present disclosure includes preparing a solution that includes silicate ions by putting a silicon compound into a solvent, in step S20.

When the silicon compound is put in the solvent, silicate ions ($SiO_3^{2-}$) are formed.

The silicon compound may be one selected from a group consisting of $Na_2SiO_3$ and $Na_2SiO_3 \cdot nH_2O$ (n=5, 6, 8, 9), and the solvent used can be one or more selected from a group consisting of water, distilled water, and deionized water.

The method of preparing a catalyst for water splitting according to the present disclosure includes combining and then precipitating the transition metal ion and the silicate ion by adding the solution that includes the silicate ion to the solution that includes the transition metal ion in step S30.

The transition metal ion and silicate ion are combined and precipitated by the electrostatic attraction of positive ions and negative ions.

The atomic ratio of the transition metal ion and the silicon ion may be 1:0.6~1.4. In the case of a silicon hydroxide compound that includes a transition metal, there are two phases which have the molecular formulas, $M_3Si_2O_5(OH)_4$ and $M_3Si_4O_{10}(OH)_2$. Therefore, when the atomic ratio is less than 0.6, a problem occurs where another compound that includes only transition metal, for example, cobalt hydroxide, is formed. When the atomic ratio exceeds 1.4, a problem occurs where only a silicon compound is formed. That is, if the atomic ratio is out of the above-mentioned range, a water splitting catalyst of the present invention cannot be prepared.

In addition, a method of preparing a catalyst for water splitting according to the present disclosure includes attaching a transition metal ion to a working electrode, by putting the transition metal ion into a solvent to prepare a solution that includes the transition metal ion, and then putting the working electrode used in electrolysis of water therein;

preparing a solution that includes a silicate ion by putting a silicon compound into a solvent;

combining the transition metal ion of the working electrode and the silicate ion by immersing the working electrode having the transition metal ion attached thereto in distilled water and then putting the working electrode into the solution that includes the silicate ion; and immersing the working electrode that is combined with the transition metal ion and silicate ion, in distilled water.

The method of preparing a catalyst for water splitting according to the present disclosure can form the catalyst for water splitting on a working electrode which is used for electrolysis of water to be used for water splitting. At this time, the working electrode may be one selected from a group consisting of carbon paper, glassy carbon, FTO (fluorinated tin oxide) and ITO (indium tin oxide). As a counter electrode, one selected from a group consisting of platinum, nickel, carbon and iron may be used.

When a transition metal is put into a solvent to prepare a solution that includes the transition metal ion, and then a working electrode used in electrolysis of water is put in, the transition metal ion becomes attached to the working electrode. In order to leave only the attached ions on the working electrode, the working electrode is immersed in distilled water. After putting in a silicon compound in a solvent to prepare a solution that includes a silicate ion, and then putting in the working electrode with the transition metal ion attached, the transition metal ion and silicate ion are combined by the electrostatic attraction of a positive ion and negative ion. In order to remove the remaining silicate ions, it is immersed in distilled water. By repeating the above-described process, the thickness of the catalyst being formed on the working electrode can be adjusted.

Example 1

Preparation of a Catalyst for Water Splitting 1

$CoCl_2$ was put into distilled water to prepare a solution in which $Co^{2+}$ ions were formed, and then $Na_2SiO_3$ was put into distilled water to prepare a solution in which $SiO_3^{2-}$ ions were formed. The solution with the $SiO_3^{2-}$ ions formed was put into the solution with the $Co^{2+}$ ions formed to combine the $Co^{2+}$ ions and $SiO_3^{2-}$ ions to prepare a catalyst for water splitting. At this time, the atomic ratio of $Co^{2+}$ ions and $SiO_3^{2-}$ was set to be 3:4.

Example 2

Preparation of a Catalyst for Water Splitting 2

A carbon paper used as a working electrode during water splitting was put in the solution having $Co^{2+}$ ions formed that was prepared in Example 1, to attach the $Co^{2+}$ ions to the carbon paper. In order to leave only the $Co^{2+}$ ions attached to the surface of the working electrode, the carbon paper was immersed in distilled water. Next, the carbon paper was put in the solution having $SiO_3^{2-}$ ions formed that was prepared in Example 1, to have the $Co^{2+}$ ions attached to the carbon paper combined with the $SiO_3^{2-}$ ions. In order to remove the remaining $SiO_3^{2-}$ ions, the carbon paper was immersed in distilled water. The $Co^{2+}$ ions and $SiO_3^{2-}$ ions were combined to form a catalyst film on the surface of the working electrode.

Experimental Example 1

Analysis of Phase and Form of a Catalyst for Water Splitting

In order to examine the phase and form of the catalyst for water splitting according to the present disclosure, X-ray diffraction (XRD), infrared absorption spectroscope (FT-IR), transmission electron microscope (TEM) and scanning electron microscope (SEM) were used in analyzing, and the results are shown in FIG. 2, FIG. 3, FIG. 4, and FIG. 5.

Figure 2:
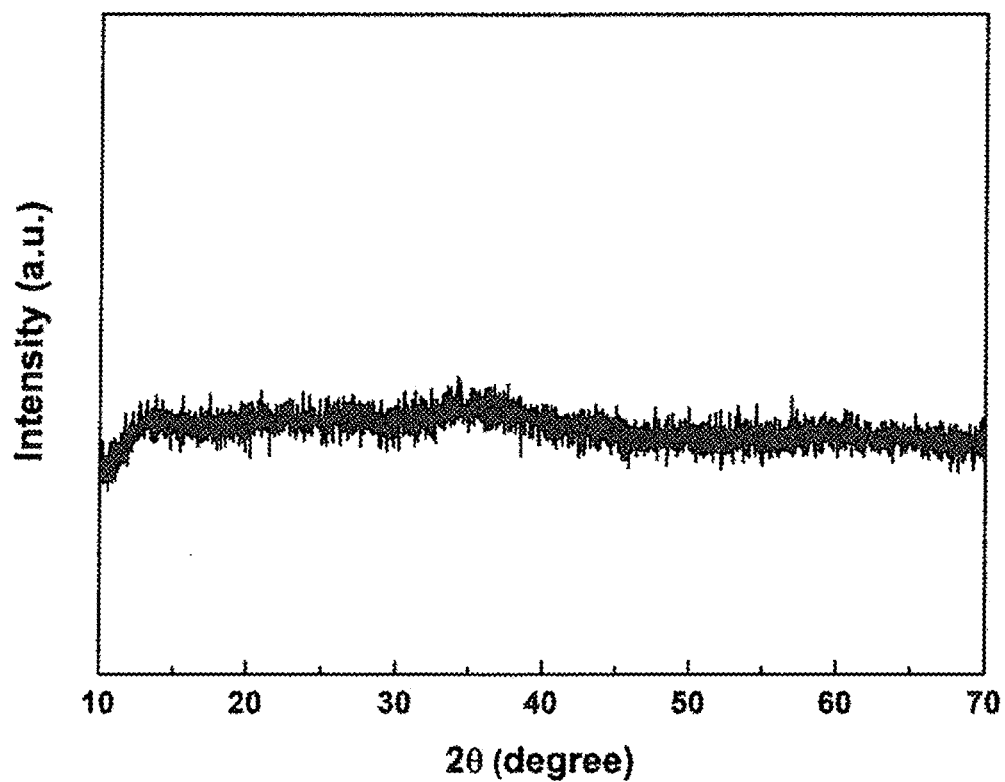
FIG. 2 shows an X-ray diffraction (XRD) analysis result of a catalyst for water splitting according to the present disclosure.

FIG. 2 shows an X-ray diffraction (XRD) analysis result of a catalyst for water splitting according to the present disclosure. As shown in FIG. 2, the prepared catalyst for water splitting was formed to be amorphous, so a peak did not appear.

Figure 3:
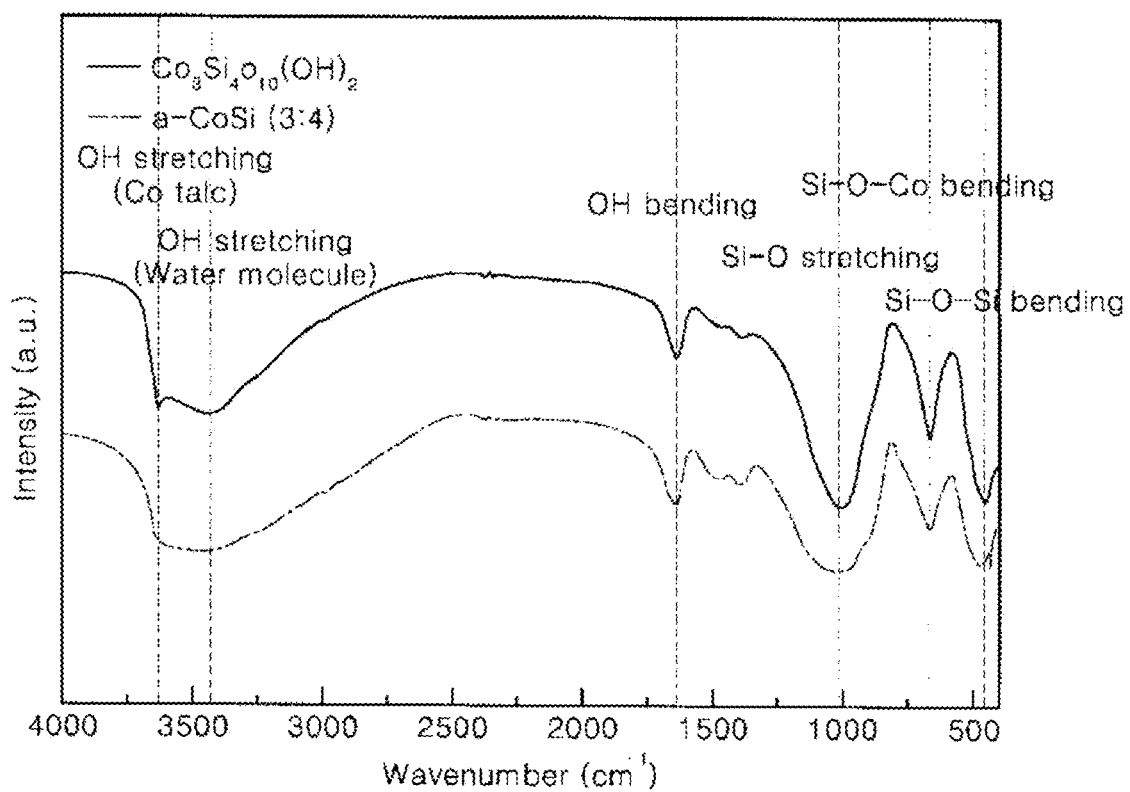
FIG. 3 is a graph showing an infrared absorption spectrum (FT-IR) analysis result of the catalyst for water splitting according to the present disclosure

FIG. 3 is a graph showing an infrared absorption spectrum (FT-IR) analysis result of the catalyst for water splitting according to the present disclosure. As shown in FIG. 3, the same FT-IR peak as that of a crystalline $Co_3Si_4O_{10}(OH)_2$ synthesized by the hydrothermal synthesis method was observed, and it was confirmed that the crystal structure was the same.

Figure 4:
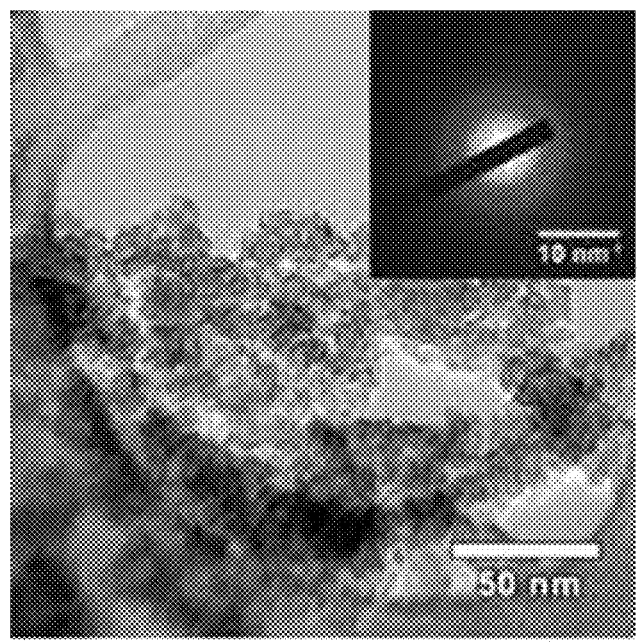
FIG. 4 is a transmission electron microscope (TEM) photograph of a catalyst for water splitting according to the present disclosure.

FIG. 4 is a transmission electron microscope (TEM) photograph of a catalyst for water splitting according to the present disclosure. As shown in FIG. 4, being formed as amorphous, a specific form was not observed.

Figure 5:
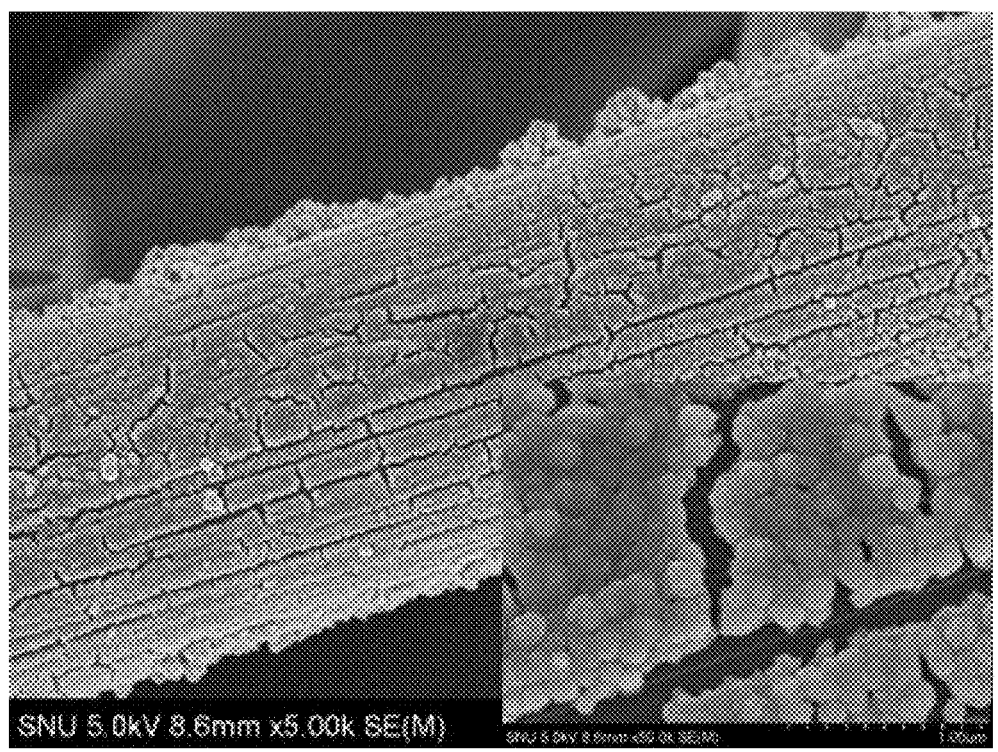
FIG. 5 is a scanning electron microscope (SEM) photograph of a catalyst for water splitting according to the present disclosure after being vapor deposited on a substrate.

FIG. 5 is a scanning electron microscope (SEM) photograph of a catalyst for water splitting according to the present disclosure after being vapor deposited on a substrate. As shown in FIG. 5, it can be seen that the catalyst for water splitting is attached to the carbon paper used as a working electrode.

Experimental Example 2

Figure 6:
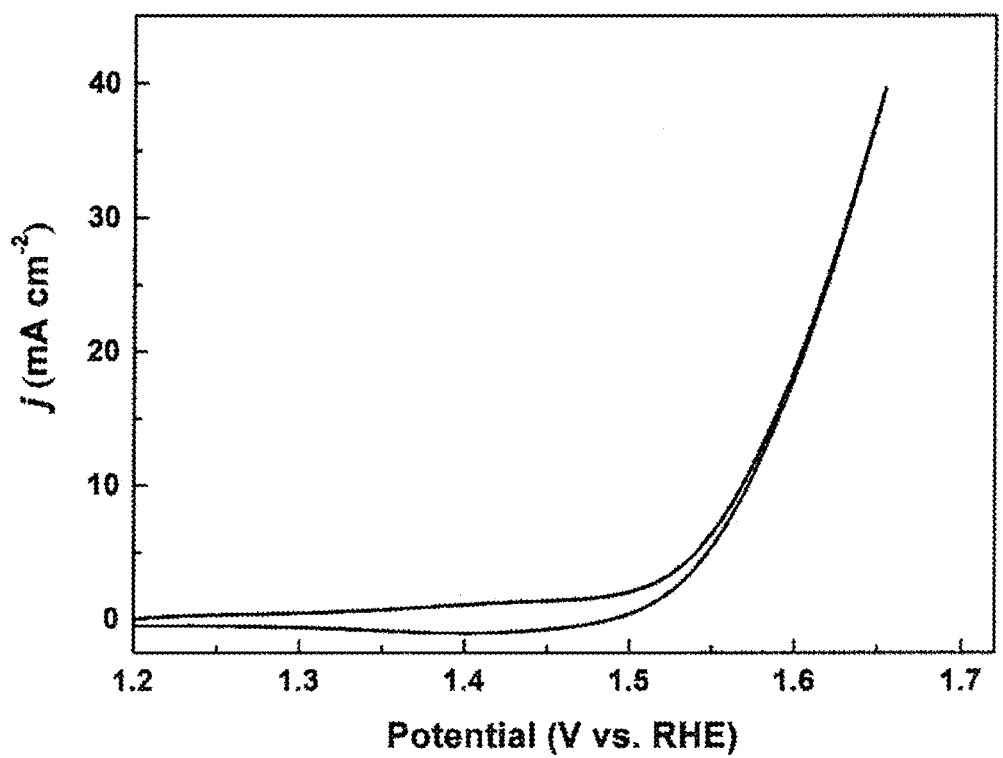
FIG. 6 is a graph showing a change in voltage when a catalyst for water splitting according to the present disclosure is used in a 1M KOH electrolyte.

Analysis of Voltage Change During Water Splitting, Using a Catalyst for Water Splitting When the catalyst for water splitting according to the present disclosure was used for water splitting, the voltage change was analyzed and the results are shown in FIG. 6.

As shown in FIG. 6, the decomposition starts at about 1.5 V, and the current density increases. In addition, it can be seen that at 1.57 V, the current density reaches 10 mA/cm$^2$, and because this is an overvoltage of about 0.34 V applied to 1.23 V, which is the theoretical water decomposition voltage, it is possible to know that water can be split at a lower voltage than the conventional catalyst for water splitting.

Although the catalyst for water splitting according to the present disclosure and the method for producing the same according to the present disclosure have been described above, it is apparent that various modifications can be made without departing from the scope of the present disclosure.

Therefore, the scope of the present disclosure should not be limited to the embodiments described, but should be determined by equivalents to the scope of the appended claims, as well as the appended claims.

In other words, it is to be understood that the above-described embodiments are illustrative in all aspects and should not be construed as limiting, and the scope of the present disclosure is indicated by the appended claims rather than the detailed description, And all equivalents and variations that come within the meaning and range of equivalency of the claims are to be embraced within their scope.

What is claimed is:

1. A catalyst for water splitting, comprising:
   a working electrode; and
   a catalyst film on the surface of the working electrode,
   wherein the catalyst film is amorphous,
   wherein the catalyst film comprises a material expressed by Chemical Formula 1 and a material expressed by Chemical Formula 2:

$$M_3Si_2O_5(OH)_4 \quad \text{Chemical Formula 1}$$

$$M_3Si_4O_{10}(OH)_2, \quad \text{Chemical Formula 2}$$

wherein, in Chemical Formulas 1 and 2, M is selected from the group consisting of Mn, Fe, Co, Ni, Cu, and combinations thereof, and
   an atomic ratio of M and Si is about 1:0.6 to 1:1.4,
   wherein the catalyst is configured to prevent catalyst corrosion, and
   wherein the catalyst is configured to enable lowering of the voltage applied during the electrolysis of water.

2. The catalyst of claim 1, wherein the working electrode is selected from the group consisting of glassy carbon, FTO (fluorinated tin oxide) and ITO (indium tin oxide).

* * * * *